H. B. LAYMAN.
VEHICLE WHEEL.
APPLICATION FILED APR. 25, 1913. RENEWED SEPT. 26, 1914.
1,142,334.
Patented June 8, 1915.
2 SHEETS—SHEET 2.
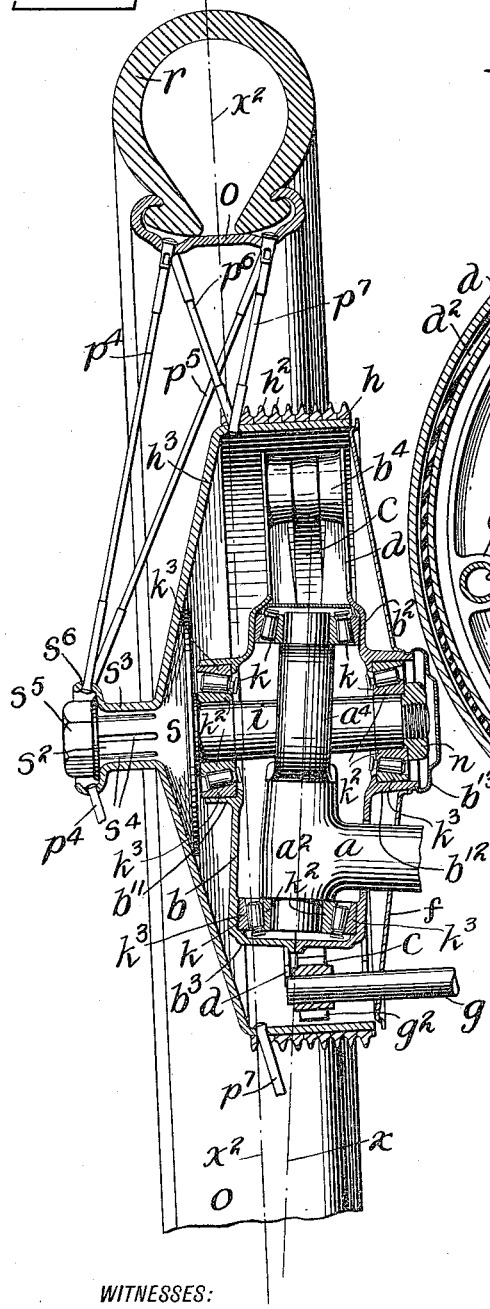
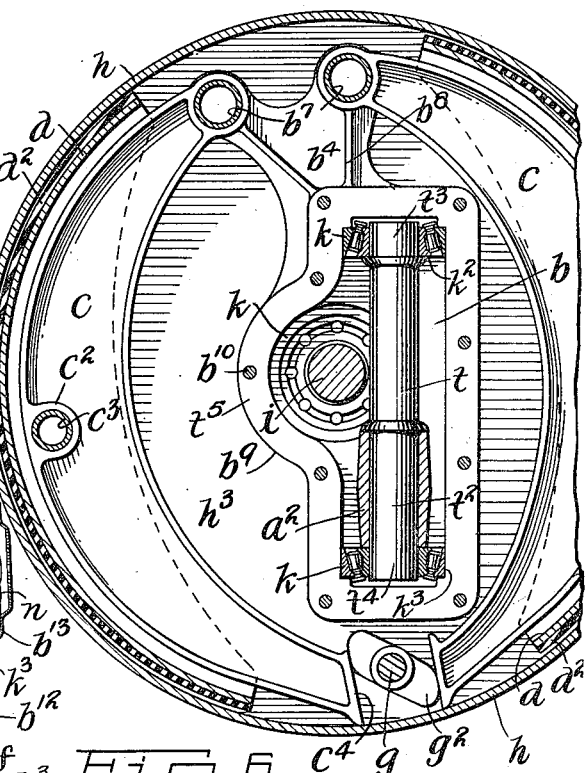
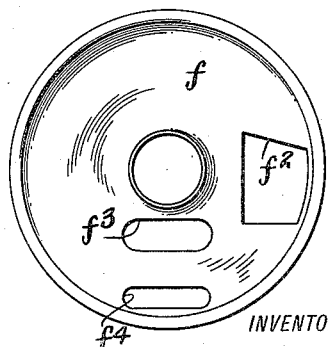
WITNESSES:
INVENTOR
Hebron B. Layman
BY
Edgar Tate & Co.
ATTORNEYS

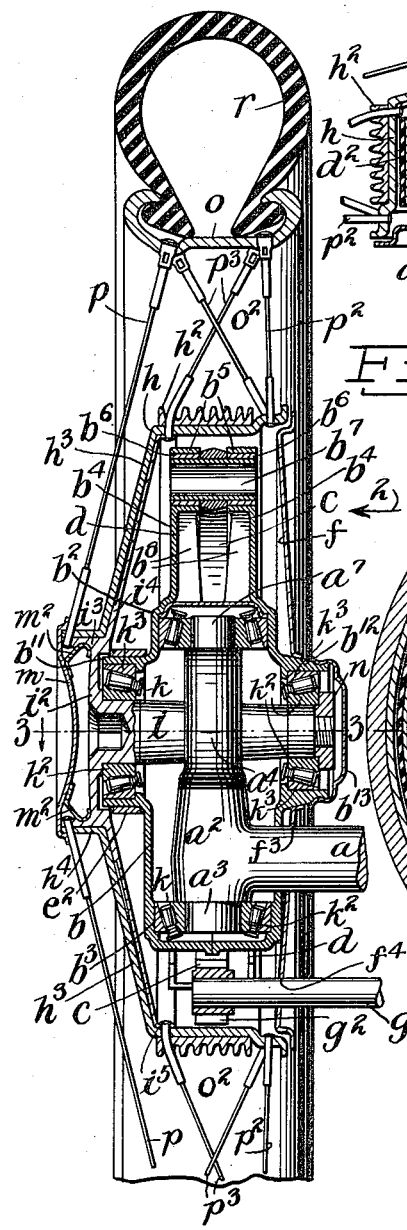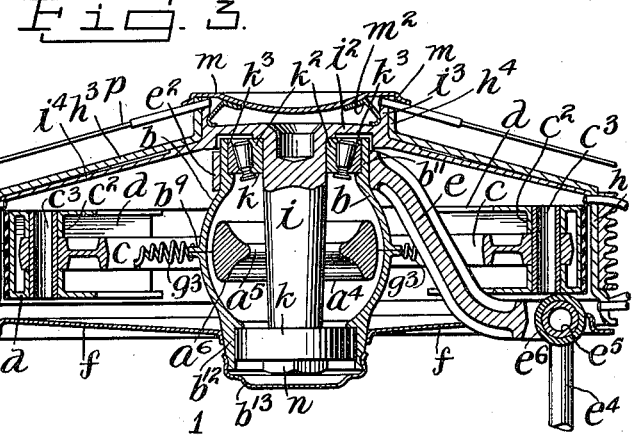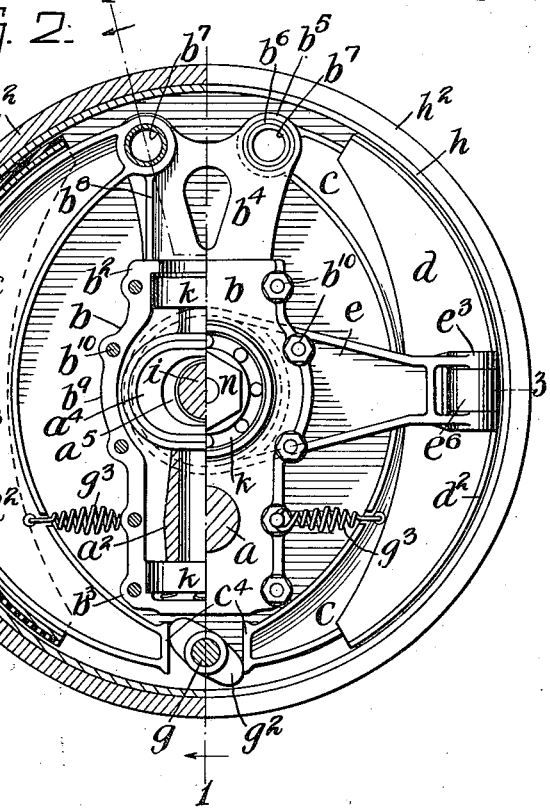

UNITED STATES PATENT OFFICE.

HEBRON B. LAYMAN, OF NEW YORK, N. Y., ASSIGNOR OF ONE-HALF TO FRANK E. LONAS, OF NEW YORK, N. Y.

VEHICLE-WHEEL.

1,142,334. Specification of Letters Patent. Patented June 8, 1915.

Application filed April 25, 1913, Serial No. 763,483. Renewed September 26, 1914. Serial No. 863,755.

*To all whom it may concern:*

Be it known that I, HEBRON B. LAYMAN, a citizen of the United States, and residing at Manhattan, in the county of New York and State of New York, have invented certain new and useful Improvements in Vehicle-Wheels, of which the following is a specification, such as will enable those skilled in the art to which it appertains to make and use the same.

This invention relates to vehicle wheels, and particularly to wheels designed for use in connection with automobiles or power driven vehicles, and still more particularly to wheels designed for use in connection with the front axles of vehicles of this class, in which the rear wheels serve as drive wheels, and the front wheels as steering or guide wheels; and the object of the invention is to provide an improved wheel and axle construction for vehicles of this class which possesses the greatest possible strength and endurance in proportion to the weight thereof; a further object being to provide a wheel and axle construction of the class specified together with my improved brake mechanism which may be easily applied whenever desired to check the vehicle or bring it to a stop, and which may be used in connection with the brake mechanism usually applied to the rear or drive wheels of the vehicle, or independent of said mechanism; a further object being to provide a wheel and axle construction of the class specified having improved means whereby the wheels of a vehicle may be manipulated in the operation of guiding said vehicle, and with these and other objects in view the invention consists in a wheel and axle construction constructed as hereinafter described and claimed.

My improved wheel and axle construction comprises an axle having a vertical upright spindle or spindles, and a wheel construction involving a central non-rotary box-shaped member mounted therein, said member, while being non-rotary, being adapted to oscillate in a horizontal plane, together with the annular rotary wheel member inclosing the central non-rotary member, and having a central free running spindle and forming also a brake drum, the central non-rotary member being provided with brake shoes operating in connection with said drum, and a rim member inclosing the rotary brake drum member, said parts being constructed, combined and operated as hereinafter described.

The invention is fully disclosed in the following specification of which the accompanying drawings form a part, in which the separate parts of my invention are designated by suitable reference characters in each of the views, and in which:—

Figure 1 is a central diametrical section of a wheel and axle construction involving my invention, with parts thereof in full lines;—Fig. 2 a side view of the central or hub portion of the wheel only and looking in the direction of the arrow 2 of Fig. 1, with an inner annular inclosing hub plate and a central hub cap forming part of said construction removed, one-half being shown in section and the other in full lines;—Fig. 3 a diametrical section on the line 3—3 of Fig. 1, or the line 3—3 of Fig. 2;—Fig. 4 a view similar to Fig. 1, but showing a modification;—Fig. 5 a view similar to Fig. 2, but showing a modification, and;—Fig. 6 a side view of the inner annular detachable hub plate, shown in Figs. 1 and 3 inclusive, detached.

In the drawings forming part of this specification, reference being made to Fig. 1, I have shown at $a$, one end of the front axle of an automobile or power driven vehicle and the end of said axle is provided with a vertically arranged spindle or spindle head $a^2$ having a bottom journal $a^3$ and the top of which is provided with a supplemental spindle or spindle head $a^4$ which is oblong in transverse section and provided with a central aperture $a^5$ which is also slightly oblong in transverse section, and the opposite side walls of which are beveled outwardly, as shown at $a^6$, and the top of the supplemental head $a^4$ is provided with a journal $a^7$.

Mounted on and inclosing the spindle or spindle head $a^2$ and the supplemental spindle or spindle head $a^4$ of the axle $a$ is a box or box-shaped non-rotary hub member $b$ which is approximately circular in form in horizontal section and which, in vertical section, is oblong in form and provided at the top and bottom thereof with circular hub or head portions $b^2$ and $b^3$, and the top circular hub or head portion $b^2$ of the non-rotary hub member $b$ is provided with upward inner and outer extensions $b^4$ having circular heads $b^5$ within which are placed bearings $b^6$ through which are passed sleeve bearings $b^7$ on which are mounted arc-shaped brake arms $c$, and the parts $b^4$ are provided on their inner sides with reinforcing ribs $b^8$.

The box-shaped non-rotary hub member $b$ is divided centrally and vertically into two parts having flanges $b^9$ through which are passed bolts $b^{10}$ by which said parts are secured together, and the brake arms $c$ are in the form of I-beams, in transverse section, and the central portions thereof are preferably wider than the end portions, and said brake arms are provided centrally with studs $c^2$ through which are passed bearing sleeves $c^3$ on which are mounted arc-shaped brake shoes $d$ which are U-shaped in cross section and the central portions of which are also preferably wider in transverse section than the end portions thereof, and the brake shoes $d$ are preferably provided on their outer surfaces with fibrous facings $d^2$. The inner and outer sides of the non-rotary hub member $b$ are also provided with circular heads or hub portions $b^{11}$ and $b^{12}$, and mounted on the inner hub or head portion $b^{12}$ is a detachable cap $b^{13}$, and mounted on the outer hub or head portion $b^{11}$ is a steering arm $e$ having a circular head $e^2$, and the steering arm $e$ is curved inwardly and outwardly and provided at its outer end with a knuckle head $e^3$ in which is pivoted one end of the steering rod $e^4$, it being understood, that in practice, the steering rod $e^4$ extends transversely of the vehicle and is connected with both the wheels of the front axle, as in other vehicles of this class. The head $e^3$ of the arm $e$ is fork-shaped in form and provided with a central bearing $e^5$ which passes through a head $e^6$ with which the rod $e^4$ is provided, but the connecting of these parts may be made in any desired manner. An annular cap plate $f$ is also mounted on the hub or head $b^{12}$ and connected therewith in any desired manner, and said plate is shown detached in Fig. 6 and is provided with an aperture $f^2$ through which the knuckle head $e^3$ of the steering arm $e$ passes, and with a slot $f^3$ through which the end of the front axle $a$ passes, and said plate is also provided with another slot $f^4$ through which is passed a brake rod $g$ having a cam head $g^2$ which operates between the free ends $c^4$ of the brake arms $c$ to operate said brake shoes, and it will also be understood that the brake rod $g$ extends transversely of the vehicle and operates the brake shoes in both of the wheels on the front axle. I have also shown in Figs. 2 and 3, contractile springs $g^3$ connected with the bottom part of the non-rotary hub member and with the brake arms $c$ for the purpose of drawing said arms inwardly and releasing the brake shoes from contact with the drum $h$, but said springs are not essential and may or may not be employed.

An annular rotary hub member and brake drum $h$ incloses the central non-rotary hub member and is preferably provided on its outer face with annular ribs $h^2$ which give strength and rigidity to said member, and said rotary hub and brake member is provided with or formed in connection with an outer inclosing plate $h^3$ having a central hub portion $h^4$, and passing transversely through the supplemental spindle or spindle head $a^4$ of the axle $a$ is a wheel spindle $i$ having a circular head $i^2$ provided with a rim $i^3$ secured in the hub portion $h^4$ of the plate $h^3$, and said head $i^2$ is provided with a flange or rim plate $i^4$ which fits on the inner side of the plate $h^3$, and is of the same dimensions and is provided at its perimeter with a flange $i^5$ which fits within the brake drum member $h$, and said brake drum member $h$, the plates $h^3$ and $i^4$ with the hub member $i^3$ of the rib plates $h^3$, and the head $i^2$ of the spindle $i$ are all secured together and rotate togther in the operation of the wheel, as hereinafter described.

Placed between the outer and inner ends of the wheel spindle $i$ and the corresponding head or hub members at the outer and inner sides of the non-rotary hub member $b$ are roller bearings $k$ of the Timken type and which comprise roller bearing or race members $k^2$ secured to the spindle $i$, and corresponding race or bearing members $k^3$ secured to the hub members or portions $b^{11}$ and $b^{12}$ of the box-shaped non-rotary hub member and between which rollers are placed; and corresponding roller bearings $k$ are also placed at the bottom of the spindle or spindle head $a^2$ of the axle $a$, and at the top of the supplemental spindle or spindle head $a^4$, in connection with the trunnions $a^3$ and $a^7$, and in this arrangement of said bearings the inner race or bearing members are connected with the trunnions $a^3$ and $a^7$, while the outer race or bearing members are connected with the heads or hubs $b^2$ and $b^3$ of the non-rotary member $b$.

A cap $m$ is detachably connected with the hub member $h^4$ of the plate $h$ and incloses the head of the wheel spindle $i$, and in the construction shown, said cap is provided with springs $m^2$ which fit in a groove in the rim $i^3$ of the head $i^2$ of the spindle $i$, but said cap $m$ may be secured in place in any desired manner, as may also the cap $b^{13}$, and the wheel spindle $i$ is provided at its inner end with a nut $n$ which is inclosed by said cap $b^{13}$.

The rim $o$ of the wheel incloses the brake drum and rotary hub member $h$ and may be of any desired form or construction in cross section, and between said rim and said rotary hub member and brake drum is in annular space $o^2$, and the said rim is connected with the outer hub portion of the wheel, consisting of the parts $h^4$ and $i^3$, by means of an outer series of spokes $p$, and with the inner edge portion of the rotary hub member and brake drum $h$ by an inner series of spokes $p^2$, and between the outer and inner series of spokes $p$ and $p^2$ are placed two other series of spokes $p^3$ which cross each other centrally of the space $o^2$ and which are connected with the opposite side edge portions of the brake drum and rotary hub member, and with the opposite side portions of the rim $o$, and all these spokes are what are known as wire spokes and may be formed and secured in place in the usual manner.

A tire $r$ of any kind or class may be mounted on the rim $o$, but in the drawings I have shown an ordinary inflatable rubber tire, but it must be understood that the shape of the rim in cross section and the character of the tire used thereon form no part of my invention, but in the operation of the wheel, the rim $o$ which is connected with the drum and rotary hub member $h$ turns with said drum and with the spindle $i$, as will be understood.

With both the front wheels of the vehicle constructed and mounted on the front axle, as herein shown and described, the rod $e^4$ may be operated to turn said wheels in a horizontal plane in order to guide the vehicle, or turn it in any desired direction, and the rod $g$ may be operated so as to force the brake shoes $d$ into contact with the rotary drum and hub member $h$, and it will be seen that the brake apparatus herein shown and described will be of great force, and by means thereof the speed of the vehicle may be quickly reduced at any time and said vehicle brought to a stop whenever necessary.

In the construction shown in Figs. 1 to 3 inclusive, the end $a$ of the axle is in a horizontal position and the spindle or spindle heads $a^2$ and $a^4$, the non-rotary hub member $b$, the rotary brake drum and hub member $h$ and the rim $o$ of the wheel are all in the same vertical plane, and the spindle $i$ passes through the supplemental spindle or spindle head $a^4$ of the axle $a$ in a plane at right angles to said spindle or spindle head, but in Fig. 4 I have shown a construction in which the end $a$ of the axle is inclined inwardly to a slight extent, and the spindle or spindle heads $a^2$ and $a^4$ of said axle correspondingly inclined inwardly, this inclination being indicated by the line $x$, while the rim $o$ and the rotary hub member and brake drum $h$ are inclined outwardly, this inclination being indicated by the line $x^2$. In this construction the body portion of the central non-rotary hub member $b$ is also in the plane of the spindle or spindle heads $a^2$ and $a^4$ of the axle $a$, but the supports $b^4$ of the brake shoe arms $c$ are inclined outwardly in a plane parallel with that of the line $x^2$, and the wheel spindle $i$ is at an angle of 90° to the line $x^2$, and the downward convergence of the lines $x$ and $x^2$ is such as to bring them together, or approximately so, centrally of the outer face of the tire at the bottom of the wheel. In this construction the spindle $i$ is provided with a head $s$ having a neck $s^2$, and the outer plate $h^3$ is provided with a sleeve neck $s^3$ through which the neck $s^2$ of the head $s$ of the spindle $i$ passes, and the neck $s^2$ of the head $s$ is provided with longitudinal key grooves $s^4$ by means of which the plate $h^3$ or the neck $s^3$ thereof may be keyed to the neck $s^2$ of the head $s$, or these parts may be connected or secured together in any desired manner, and the outer end of the neck $s^2$ is provided with the usual hub nuts $s^5$. The arrangement of the spokes in this construction is also different from that shown in Fig. 1, the spokes in this construction consisting of two series $p^4$ and $p^5$ connected with the opposite side portions of the rim $o$ and with an annular rim $s^6$ on the sleeve $s^3$, and two other series $p^6$ and $p^7$ connected with the opposite side portions of the rim $o$ and with the outer side edge portion of the brake drum and rotary hub member $h$, and with these exceptions, the construction shown in Fig. 4 is the same as that shown in Fig. 1.

In Fig. 5 I have shown another modification of the construction shown in Figs. 1 to 3 inclusive in which a vertical spindle $t$ is substituted for the supplemental spindle or head $a^4$ of the spindle or head $a^2$, said spindle $t$ being provided with a shank $t^2$ which passes downwardly through the head $a^2$ of the axle $a$ and the upper and lower ends of which are provided with trunnions $t^3$ and $t^4$ which take the place of the trunnions $a^7$ and $a^3$, and in this form of construction, the non-rotary box-shaped hub member $b$ is provided with an enlargement $t^5$ at one side thereof through which the spindle $i$ passes, and with these exceptions, the construction shown in Fig. 5 is the same as that shown in Figs. 1 to 3 inclusive and will operate in the same manner.

The supplemental spindles or heads $a^4$ of the heads $a^2$ of the axle $a$ in Figs. 1 and 4 may be formed integrally with said axle, or they may be provided with spindles mounted in or passing downwardly through said heads, and various other changes in and modifications of the construction herein described may be made, within the scope of the appended claims, without departing from the spirit of my invention or sacrificing its advantages.

With the construction shown in Fig. 1 and herein described, it will be seen that the axial line of the wheel spindle is parallel with and above the corresponding line of the axle, and this is approximately true of the construction shown in Fig. 4, in which, however, the axial line of the wheel spindle is at a slight angle to the corresponding line of the axle, and in both forms of construction, the wheel spindle is in the same vertical plane as the axle, and this construction and arrangement of parts, when taken in connection with the details of the construction of the wheel or wheels, whereby they are connected with the axle, and the load of the vehicle supported, strengthens the wheels and facilitates the operation thereof, especially in connection with the horizontal oscillation of said wheels, in the operation of guiding the vehicle. It must also be borne in mind that while I have shown and described my improved wheel or wheels as particularly applicable to the front axle of an automobile or power driven vehicle, my invention is not limited to such application or use, as my improved wheels may also be applied to the rear axle of an automobile or other vehicle of the class specified, all that would be necessary being to substitute the spindles of the rear axle for the spindles $i$ herein shown and described, and provide a stationary connection for the central non-rotary hub member $b$.

Although I have described the parts $a^2$ and $a^4$ respectively as a spindle or spindle head, and a supplemental spindle or spindle head, it will be understood that these parts, taken together, form the spindle or spindles of the axle and extend above and below the same to provide for the bearings of the non rotary central part or hub member of the wheel, and these spindle members may be formed integrally with the axle, or independent thereof, in which latter event, the spindle will be mounted in a head formed on, or in connection with, the axle.

Having fully described my invention what I claim as new and desire to secure by Letters Patent is:—

1. In a wheel and axle construction, an axle provided with an upright end spindle which extends above and below the same and the top part of which above the axle is provided with a transverse opening, a central box-member mounted on the top and bottom of said spindle and adapted to oscillate in a horizontal plane, an annular rotary member inclosing the central box member and provided with a wheel spindle which passes inwardly through the aperture in the axle spindle, and a rim member connected with the annular rotary member, the wheel spindle being above and in the plane of the axle, and being approximately parallel therewith.

2. In a wheel and axle construction, an axle provided with a vertically arranged end spindle which extends above and below the same, and is provided above the axle with a transverse aperture, a central box member mounted on the top and bottom of said spindle and inclosing the same and adapted to oscillate in a horizontal plane, an annular rotary member inclosing the central box member and provided on its outer side with a wheel spindle which passes through the aperture in the axle spindle and has end bearings in the central box member, said rotary member being adapted to serve as a brake drum, brake shoes connected with the central box member and adapted to operate in connection with said brake drum, and a rim connected with the annular rotary member, the wheel spindle being above and in the plane of the axle, and being approximately parallel therewith.

3. In a wheel and axle construction, an axle provided with a vertically arranged end spindle which extends above and below the same and the top portion of which is provided with a transverse aperture, a central box member mounted on the top and bottom of said spindle and inclosing the same and adapted to oscillate horizontally thereon, and provided with brake shoes, an annular rotary member inclosing the central box member and adapted to serve as a brake drum and the outer side of which is inclosed by a plate provided with a central wheel spindle which passes through the aperture in the axle spindle and through the central box member and is provided with end bearings therein, a rim connected with the annular rotary member, and means for oscillating the central box member, the annular rotary member and the rim in a horizontal plane on the spindle of the axle, the said axle spindle and the central box member being in a plane different from that of the annular rotary member and the rim, the wheel spindle being above and in the plane of the axle, and being approximately parallel therewith.

4. In a wheel and axle construction, an axle provided with an upright end spindle which extends above and below said axle, a central box member mounted on the top and bottom of said spindle and adapted to oscillate in a horizontal plane thereon, said axle spindle extending vertically through said box member and being provided at the top and bottom thereof with bearings, an annular rotary member inclosing the central box member and provided on the outer side thereof with a plate having a central wheel spindle which passes inwardly through the central box member and transversely of the axle spindle and is provided with bearings in said box member, and a rim connected with the annular rotary member, the wheel spindle being above and in the plane of the axle, and being approximately parallel therewith.

5. In a wheel and axle construction, an axle provided with a vertical upwardly directed end spindle, a spindle box mounted thereon and adapted to oscillate in a horizontal plane, said spindle box being provided with a central horizontal wheel spindle casing and a vertical axle spindle casing, and through which the spindle of the axle passes, and a wheel member mounted on and rotatable on the spindle box and adapted to oscillate horizontally therewith and provided centrally of its outer side with a spindle head which incloses the outer end of the spindle box and which is provided with a wheel spindle which passes inwardly and horizontally through the wheel spindle casing therein.

6. In a wheel and axle construction, an axle provided with an upright spindle having an aperture, a central box member mounted on said spindle, and through which said spindle passes, said box member being adapted to oscillate in a horizontal plane, and a wheel member inclosing said box member and provided on its outer side with a wheel spindle which passes inwardly through said box member.

In testimony that I claim the foregoing as my invention I have signed my name in presence of the subscribing witnesses this 23rd day of April, 1913.

HEBRON B. LAYMAN.

Witnesses:
S. ANDREWS,
C. MULREANY.